United States Patent [19]

Rapoport

[11] Patent Number: 4,591,213
[45] Date of Patent: May 27, 1986

[54] BRAKING SYSTEM

[75] Inventor: Uri Rapoport, Oak Park, Ill.

[73] Assignee: LandAire DynaBrake, Inc., Chicago, Ill.

[21] Appl. No.: 487,320

[22] Filed: Apr. 21, 1983

[51] Int. Cl.$^4$ ................................................ B60T 8/00
[52] U.S. Cl. ............................ 303/93; 188/106 P; 188/181 C; 244/111; 303/92; 340/52 B
[58] Field of Search .................. 188/264 R, 382, 354, 188/151 A, 1.11, 106 P, 18 R, 68, 85, 181 C, 71.6; 303/2, 3, 6 A, 18, 92, 93, 100, 103; 244/110 A, 110 H, 111; 340/57, 52 B; 246/169 A; 192/82 T, 48.7, 87.14–87.19

[56] References Cited

U.S. PATENT DOCUMENTS

| | | | |
|---|---|---|---|
| 3,537,551 | 11/1970 | Serra | 188/264 R |
| 3,582,926 | 6/1971 | Hassan | 340/57 X |
| 3,623,576 | 11/1971 | Waring | 188/71.6 |
| 3,730,301 | 5/1973 | Heck et al. | 188/71.6 |
| 3,797,612 | 3/1974 | Carias | 188/18 R X |
| 3,810,087 | 5/1974 | Suzuki | 340/52 B |
| 3,922,640 | 11/1975 | Ruof | 340/57 |
| 4,020,454 | 4/1977 | Malonee | 340/52 B |
| 4,029,859 | 6/1977 | Armstrong et al. | 246/169 A X |
| 4,241,603 | 12/1980 | Han et al. | 188/1.11 X |
| 4,392,202 | 7/1983 | Matsuda | 303/93 X |

Primary Examiner—Bruce H. Stoner, Jr.
Assistant Examiner—Michael P. Gilday
Attorney, Agent, or Firm—Hill, Van Santen, Steadman & Simpson

[57] ABSTRACT

There is disclosed herein a braking system for use in safely reducing the speed and stopping movement of vehicles, such as cars or trucks, or airplanes, by minimizing brake failure due to heat build-up and by providing auxiliary braking capacity. The system includes primary and secondary brake sections associated with weight-supporting and braking wheels, temperature sensors for sensing the temperature in each brake section, friction force sensors for sensing frictional forces in each section and pressure sensors for sensing hydraulic or pneumatic pressure. Controls receive the sensed temperature, friction forces and pressures and selectively activate, individually or in combination, the primary and secondary brake sections. The controls include an apparatus for comparing the measured pressure, friction forces and brake temperatures with predetermined values and automatically operating the braking system in response to those comparisons. A manual override is provided to permit manual operation of the brake system independent of the automatic mode. A logic system is provided for determining whether the primary section operates by itself, whether operation is switched to the secondary section, or whether both the primary and secondary sections operate in combination.

13 Claims, 5 Drawing Figures

BRAKING SYSTEM

BACKGROUND OF THE INVENTION

This invention relates to braking systems, and more specifically, to a braking system for use in aircraft or vehicles, such as cars, trucks, and the like.

In modern aircraft the landing gear is divided into left- and right-hand sides and includes weight-supporting wheel assemblies. These wheel assemblies include a braking system with individual disc-and-caliper-type brakes. Each of the brakes must absorb and dissipate large quantities of energy in order to slow and stop the aircraft. The brake pad associated with each caliper absorbs energy, builds up heat, and thus its operating temperature increases. As the temperature rises, the pad's braking capacity or efficiency decreases, which in an extreme situation could lead to brake failure and possibly catastrophic results.

In existing braking systems, seven or eight brake discs or rotors are slidably mounted on the wheel shaft and each of the rotors are grasped, during braking, by caliper pads.

Numerous braking systems are known in the prior art for various safety purposes. For example, dual braking systems are known for providing a back-up system in the event of a failure and other systems are provided to prevent the vehicle from slipping and for preventing forward pitching. See, for example, U.S. Pat. Nos. 2,948,359; 3,186,516; 3,790,227; 3,797,893; 3,926,479; 3,951,239; 3,966,008; 4,095,848; 4,207,968; and 4,278,151.

However, none of these systems provide a reliable braking system for aircraft recognizing the high heat build-up and potential loss of braking friction experienced by aircraft brakes.

It is therefore the primary object of the invention to provide a braking system for use in aircraft which prevents or minimizes the likelihood of catastrophic brake failure due to brake heat build-up or loss of braking friction These and other objects of the invention will become apparent from the following specification and appended claims.

SUMMARY OF THE INVENTION

A braking system is disclosed herein which minimizes brake heat build-up by providing at least two independent braking sections in each set of brakes, which sections cooperate so as to permit brake cooling in the event that heat build-up becomes excessive. Appropriate sensors and logic means are provided for sensing heat build-up and other functions and for selecting and switching between braking sections in order to minimize heat build-up and maximize efficiency. For example, during initial braking, a first or primary braking section is used, and when its temperature exceeds a predetermined critical temperature for a predetermined length of time, the braking function is shifted to a second or secondary braking section which operates while the first section cools. In the event the secondary section reaches the critical temperature, the primary section is reengaged. If at that time the primary section is below the critical temperature, then the secondary section is disengaged. On the other hand, if both the secondary and primary are above the critical temperature, both are engaged and the braking forces are applied to both with the cooler section receiving more of the braking force.

This system also senses the frictional forces on the brake sections so as to redistribute the braking function in the event of friction losses which might be caused by events such as temperature increases above the critical value, brake fluid leakage (either hydraulic or pneumatic), or the like.

It has been determined that this system, in addition to being useful in aircraft, can be used in vehicles such as cars, trucks, and the like.

DESCRIPTION OF THE PREFERRED EMBODIMENT

A Braking System

Figure 1:
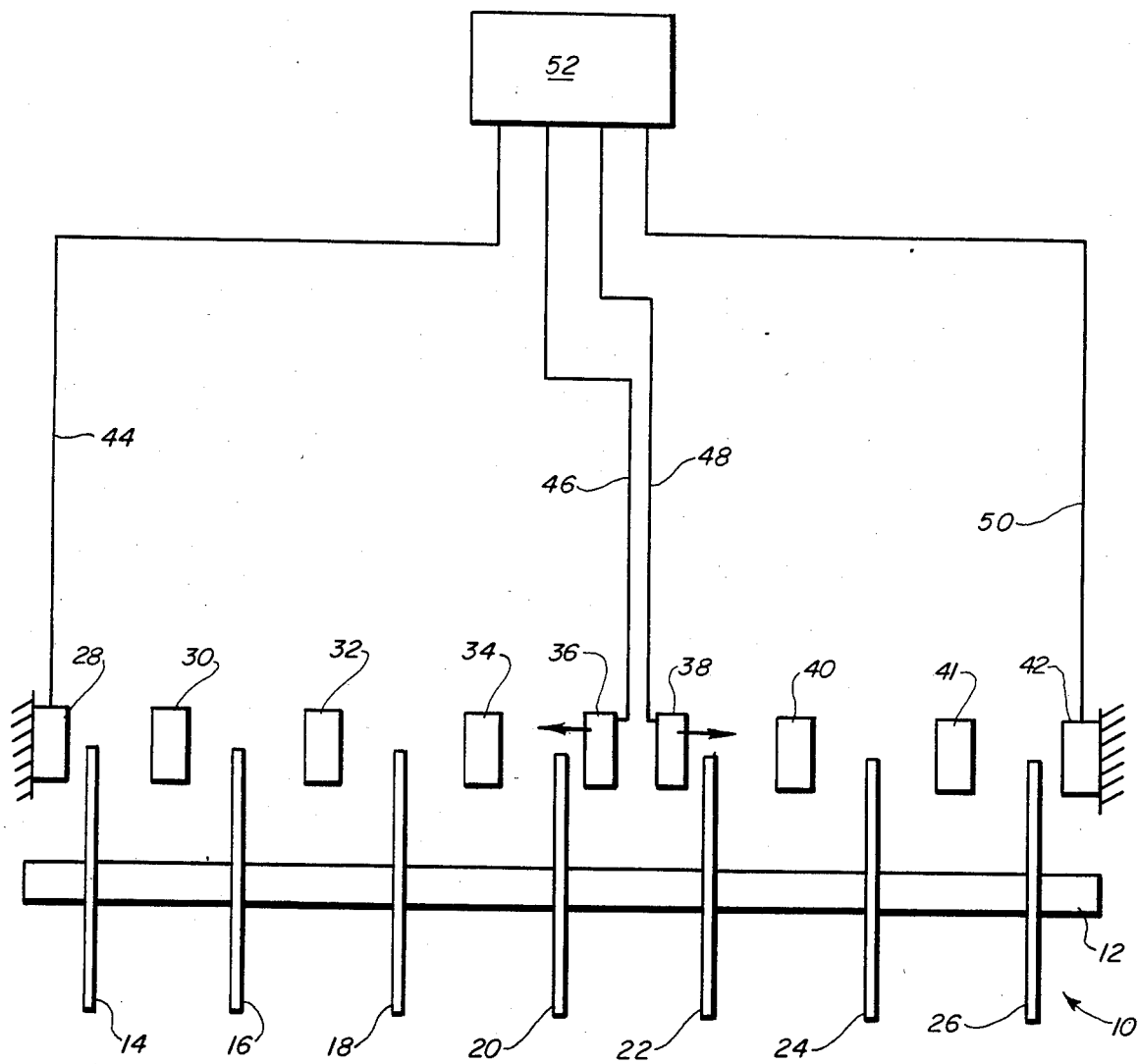
FIG. 1 is a diagrammatic view of a typical braking system for a single wheel assembly.

Referring to FIG. 1, a braking system 10 for one wheel of an aircraft's landing gear is shown and includes a wheel shaft 12 on which is mounted seven (7) axially movable brake discs 14, 16, 18, 20, 22, 24 and 26. Nine (9) brake pads 28, 30, 32, 34, 36, 38, 40, 41 and 42 for grasping and slowing the brake discs are shown. The pads are mounted to conventional brake calipers (not shown) which are, in turn, supported on a conventional wheel housing (not shown). The brake discs and pads are stacked for this grasping action.

In accordance with this invention, the brakes are divided into primary and secondary sections. The primary section includes the four (4) discs 14, 16, 18 and 20 and pads 28, 30, 32, 34 and 36. The secondary section includes discs 22, 24 and 26 and pads 38, 40, 41 and 42. The primary and secondary sections are controlled via brake lines (either hydraulic or pneumatic) 44, 46, 48 and 50 from control box 52. Selective and controlled application of braking pressure can cause the primary and secondary sections to operate individually or in combination.

Temperature sensors (not shown in FIG. 1) are provided to measure the temperature of each pad and pressure sensors (not shown in FIG. 1) are provided to measure the pressure in the brake lines 44, 46, 48 and 50, which, in turn, relates to the frictional forces applied to the brakes. Depending upon the system in use, the temperature sensors can detect and provide data as to the highest temperature of any pad or the average temperature of all pads. Sensors can be located on the pad or disc and can be of several known types depending on the particular case.

Control Unit Logic

For each braking system, several critical parameters are determined. One parameter is the critical or maximum temperature for the brake pad (Tc). The other parameters relate to brake pressure (P), minimum required braking or calculated frictional forces (Fc), and various time factors. The relationship between brake pressure (P) and frictional forces (Fc) is determined as well as various time factors governing brake application, such as the time delay between pedal activation and brake application. This is sometimes referred to as "ramp up".

During brake application, the actual operating pressure, friction forces, pad temperatures and operating times are compared against the calculated values previously determined.

Figure 2:
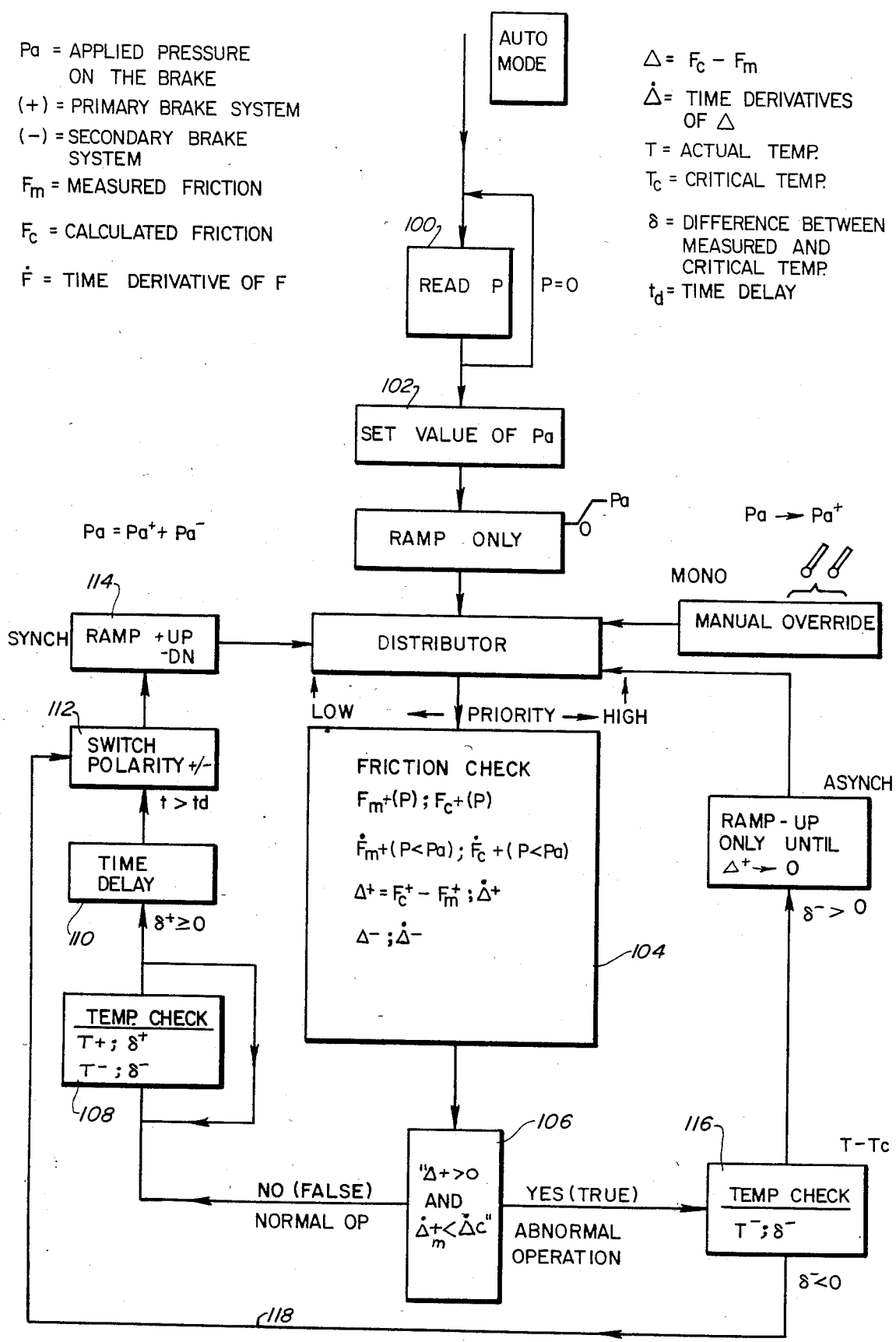
FIG. 2 is a flow diagram which shows the logic and operation of the braking system.

Referring now to the flow chart of FIG. 2, it is seen that the various functions are indicated by the blocks and the direction of operation is shown by the arrow indicators. It will be understood that the brake system will operate in the manual mode and that FIG. 2 represents the automatic mode.

When the system is operating in the automatic mode, the actual brake pressure (Pa) is read at sensor 100. If the pressure is zero (0) due to the fact no force is being applied to the brake pedal, the sensor cycles until a value is detected and read or set into the system at 102. Each value read into the system generates a corresponding calculated friction value Fc(P) from the previously determined data. Thus the ideal friction force for each pressure is calculated from the actually applied pressure. Thereafter, the pressure on the brakes is "ramped up" (i.e., applied other than instantaneously).

From there the first series of checks on the system for proper functioning are made with the friction check shown in box 104. Here the first determination is a comparison between the measured friction (Fm) from the brake sensor and calculated friction (Fc) from the pressure measurement. In order to function properly, measured friction (Fm) must be greater than or equal to calculated friction (Fc). That is:

$Fm \geq Fc$ or $\Delta = Fc - Fm \leq 0$

This check is continuously made at all times during operation. Thus even if during operation the brake pressure (P) returns to zero (0), the system will thereafter continue the check.

However if measured friction is less than calculated friction (i.e., $\Delta > 0$), then the braking system may be operating improperly. For example, there may be a leak in the brake lines. While not absolute necessary, in order to be certain that this reading (i.e., $\Delta > 0$) is not due to initial system pressure build-up, an additional check is made. In this check the rate of change of actual pressure and friction with time is compared to calculated values. If, in fact, there are no differences between the calculated and measured frictional forces with time due to pressure build-up, or the like, the system is functioning properly, notwithstanding $\Delta > 0$. On the other hand if the actual rate of change is less than the calculated rate of change, then a friction problem is confirmed.

Thus, if the measured friction is less than the calculated friction and the change in measured friction is less than the change in calculated friction, that indicates that there is a problem. Thus the first determinations have been whether or not measured friction is less than calculated friction, and whether the rate of change of measured friction is less than the rate of change of calculated friction.

If measured friction is greater than or equal to calculated friction and the rate of change of measured friction is greater than or equal to the rate of change of calculated friction, then the frictional and pressure aspects of the system are operating properly and the secondary test of a heat check can be run. Block 106 indicates the critical friction checks. In other words, if the checks are in order as indicated in block 106, then operation of the system proceeds in accordance with the left-hand branch to the temperature check. If not, then the system operates along the right-hand branch.

Turning to the left-hand branch, (i.e., friction checks are correct), the temperatures in the primary and secondary sections are compared with the predetermined critical braking temperature. If the primary measured temperature (Tm) is less than the critical temperature (Tc), then no changes are made in the system and the temperature checks recycles. However, if the actual temperature (Tm) is equal to or greater than the critical temperature (Tc) so that the difference (i.e., Tm−Tc) is greater than zero (0), then the time delay is activated to compare the time during which the pad is at or above the critical temperature with a predetermined minimum acceptable time. If the time is less than the acceptable value, then no further action is taken. However, if time is greater than the acceptable value, the system then commences to change the operation from the primary braking section to the secondary braking section. That is done via system functions 112 and 114. In switching between sections, a pressure regulator, usually hydraulic, gradually decreases pressure on the primary and increases pressure on the secondary with the total applied pressure remaining constant.

By the use of central line and left-hand branch, the system is checked to determine if the frictional forces are proper in the primary section and the temperature conditions in the primary section. If the friction conditions are within the specified range and the temperature conditions are within the specified range, then the braking system is not switched from the primary to the secondary. If the friction conditions are proper but temperature and delay time conditions are greater, then a switch is made from the primary to the secondary.

Referring now back to block 106, in the event the friction conditions are not within the specified limits, (i.e., $Fm < FC$ and $\Delta_m < \Delta_c$), temperature check of the secondary section is made at block 116. In the event that the secondary actual temperature (Tm) is less than the secondary calculated critical temperature (Tc), then the secondary section is in condition to be operated individually and the system is operated along line 118 to the switch polarity, wherein the braking system is moved to the secondary section from the primary section.

In the event that the actual secondary temperature is greater than the critical temperature, then the secondary section is activated directly without disengaging the primary so that both the primary and secondary sections are functioning simultaneously. In this mode, the braking pressure in the secondary is measured until $Fm = Fc$ or $\Delta = 0$.

Thus by this system, if the friction on the primary section is proper, the primary section continues to operate. However, if the friction on the primary section is proper, but the primary's temperature is above the critical temperature for longer than the predetermined time, the brake system is switched over to the secondary so that it may run.

In the event that the friction in the primary is too low and the temperature in the secondary section is sufficient, then the system is switched from the primary to secondary. In the event that the primary friction is too low and even if the temperature on the secondary section is above critical, the secondary section begins to operate, but the primary remains engaged.

Once the secondary section is operating, checks are run on the secondary section as described above with reference to the primary. In other words, pressure and friction are first determined on the secondary section and its temperature is determined, and if that is satisfactory, it continues in operation. If the temperature on the primary section is reduced to below the critical level and the secondary reaches the critical value, then braking will be switched back to the primary section.

In the event that friction in both systems is proper but the temperature on both the primary and secondary systems is above the critical temperature, then both the primary and secondary will operate until the temperature of the primary or secondary falls below the critical value or the aircraft or vehicle stops.

Appropriate indicator lights are provided in the cockpit in order to indicate to the pilot which of the various braking systems and sections are operating. Furthermore, appropriate manual overrides are also provided so that the pilot in his discretion can manually control the braking functions.

It is believed that the primary section once disengaged will cool to a temperature below its critical temperature, thereafter permitting switching back to the primary section. Furthermore, it is believed that removing the primary section from operation so that it may cool will increase the braking efficiency of the total braking system beyond that of the typical single section systems. In other words, the combination and ability to switch between the primary and secondary sections provides greater cooling capacity and energy absorption than would be possible in a prior single system of the same size. Furthermore, this type of system permits a backup in the event of the failure of the friction or braking fluid system so that there is still some reserve braking capacity even in the event that the primary section failed.

In this system the friction and heat detection modes have been used in combination, but it should be appreciated that they can be used independently.

System Schematic

Figure 3:
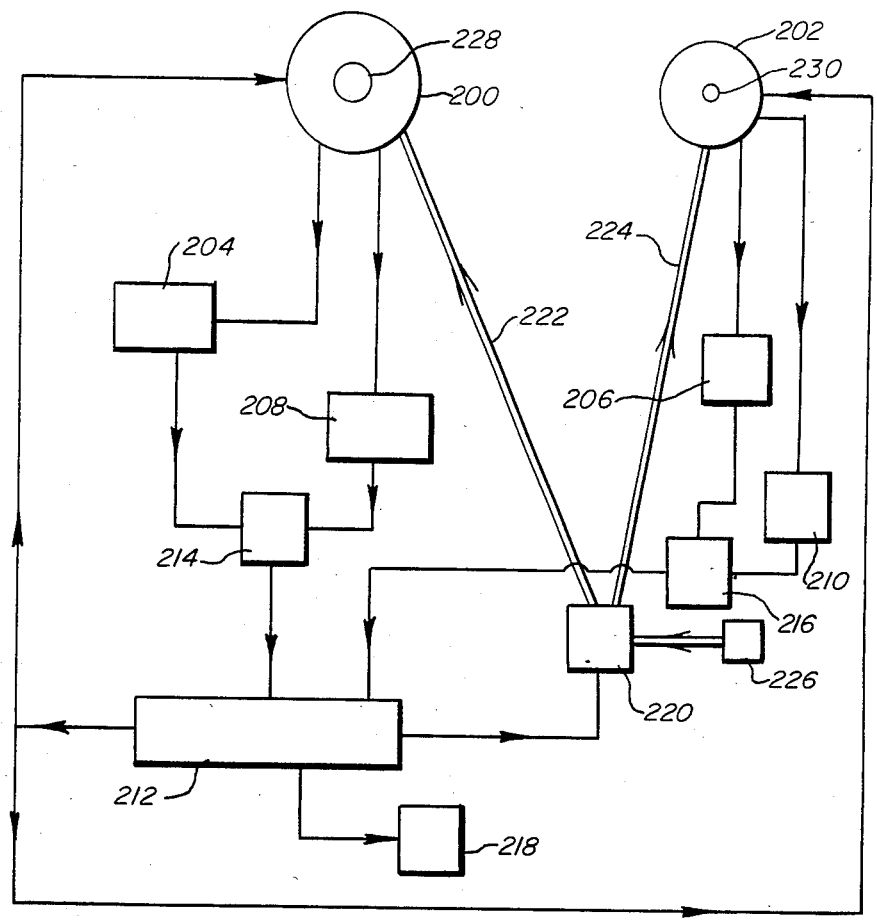
FIG. 3 is a schematic diagram of an exemplary braking system.

Referring now to FIG. 3, a schematic diagram of the system is shown. The primary braking section 200 and secondary braking section 202 are shown as are the associated temperature sensors 204 and 206 and friction sensors 208 and 210. Information concerning temperature and friction is sensed at the brake sections and coupled to the logic unit 212 through junctions 214 and 216. The logic unit is coupled to the cockpit display 218 and the hydraulic or brake pressure control and sensor 220 which is, in turn, coupled via lines 222 and 224 to the brake sections 200 and 202. An independent brake pedal is indicated at 226. If it is desired to provide auxiliary cooling gases, the logic unit 212 can be coupled to the compressors 228 and 230 which deliver gases to the brakes. Other alternative cooling systems can be employed depending on the situation.

Alternative Brake Arrangements

Figure 4:
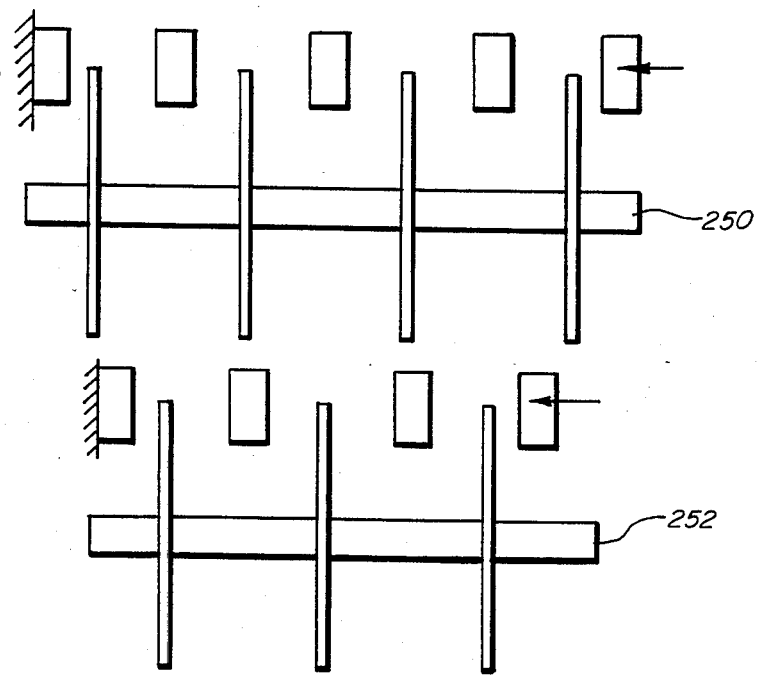
FIG. 4 shows a braking system for a two-wheel assembly.
Figure 5:
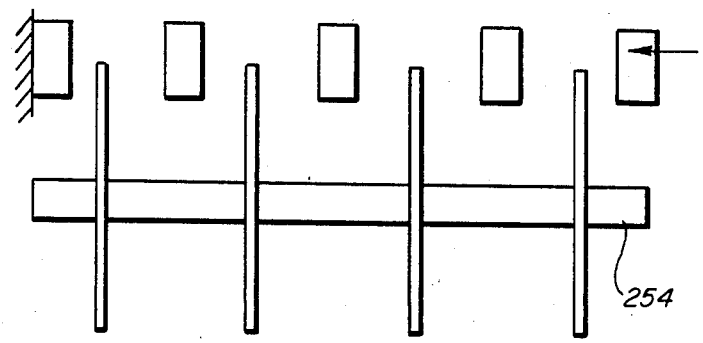
FIG. 5 shows a braking system for a three-wheel assembly.
Figure 5:
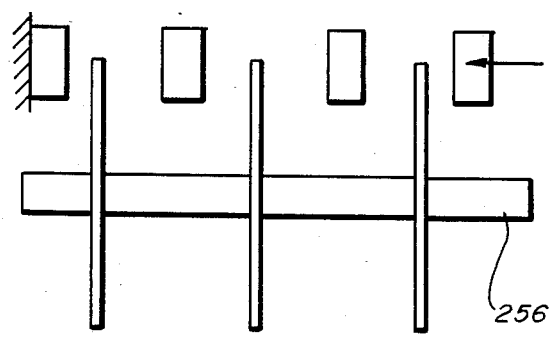
Figure 5:
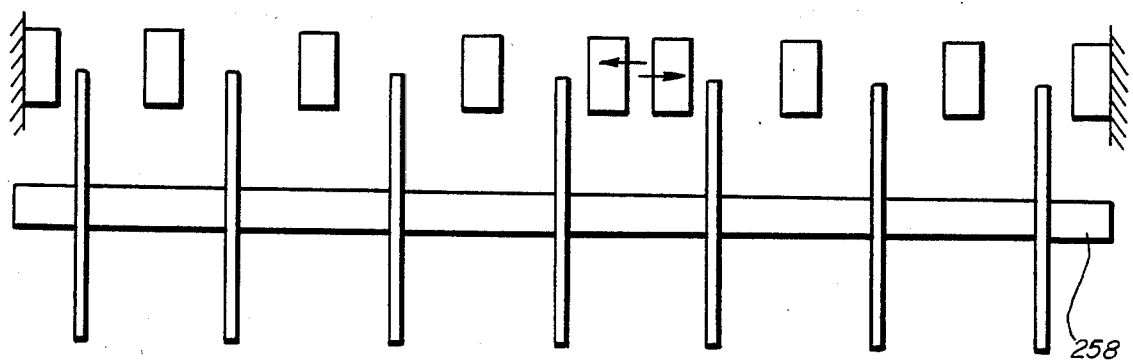

In some situations, each aircraft landing gear wheel assembly includes two tandem wheels, and referring back now to FIG. 4, it is seen that two wheel shafts 250 and 252 are provided. In this system the primary braking section can be on a forward wheel 250, and the secondary braking section can be on the rear wheel 252. Braking action can be manipulated back and forth between those two sections as discussed above.

In some large aircraft there may be three wheels in each wheel assembly. For braking, there could be a combination of a primary on one wheel 254, secondary on a second wheel 256, and a combined primary and secondary on a third wheel 258. The logic in operating this system is the same as set forth above, except that the physical braking systems operated are different.

Braking systems which include hydraulic lines, pistons, calipers, discs, and pads are known. Furthermore, electronic logic controls and microprocessor technology which sense and control the operation of a system is known. It is the combination as set forth herein and the method of operation thereof that is new and novel.

It is anticipated that this braking system can be employed in road vehicles, such as cars and trucks, as well as airplanes. In a simple application like a car, all four wheels can be fitted with primary and secondary braking sections. Other variations could include providing the primary and secondary on diagonal sets of wheels. For example, the primary could be on the right front and left rear and the secondary on the left front and right rear. In multiple-wheel truck applications where there are two "back-to-back" wheels on a single axle, the primary could operate the outer brake and the secondary, the inner brake.

It will be appreciated that numerous changes and modifications can be made to the embodiment shown herein without departing from the spirit and scope of this invention.

What is claimed and desired to be secured by Letters Patent of the United States is:

1. A braking system for cooperation in safely reucing the speed and stopping movement of a vehicle by minimizing brake failure, said vehicle having weight supporting wheel assemblies and a plurality of said assemblies having brakes associated therewith, said system including primary and secondary brake sections associated with wheel assemblies having brakes, means for sensing the temperature of each brake section, control means for receiving the sensed temperatures and for selectively activating, individually or in combination, the primary and secondary brake sections, said control means further including means for comparing the measured brake temperature with a predetermined brake temperature and activating said system in response thereto; whereby the primary section is initially engaged for braking until its temperature exceeds a predetermined critical value at which point a secondary brake section is engaged, said control means senses the temperature of the secondary brake section, and if said temperature is below the critical value, disengages the primary brake section, and said sensing means senses the temperature of the secondary brake section, and if said secondary brake section is above the critical temperature, said system engages the secondary while the primary is still engaged.

2. A braking system for cooperation in safely reducing the speed and stopping movement of a vehicle by minimizing brake failure, said vehicle having weight supporting wheel assemblies and a plurality of said assemblies having brakes associated therewith, said system including primary and secondary brake sections associated with wheel assemblies having brakes associated therewith, means for sensing frictional froces associated with each brake section, control means for receiving the sensed frictional forces and for activating the primary and secondary sections, said control means including means for comparing the measured frictional forces with a predetermined value and activating said sections in response to the comparison, whereby the primary section is initially engaged for braking and, in the event the measured frictional forces are less than the predetermined frictional force engaging the secondary brake section.

3. A braking system for cooperation in safely reducing the speed and stopping the movement of a vehicle by minimizing brake failure due to heat build up and by providing auxiliary braking capacity, said vehicle having weight supporting wheel assemblies and a plurality of said assemblies having brakes associated therewith, said system including:

primary and secondary brake sections associated with those wheel assemblies having brakes associated therewith;

means for sensing the temperature of each brake section;

means for sensing the frictional forces associated with each section;

control means for receiving the sensed temperatures and sensed frictional forces and for selectively activating, individually or in combination, the primary and secondary sections, said control means further including means for comparing the measured frictional force and measured brake temperature with predetermined values and activating said system in response to the comparison;

whereby the primary section is initially engaged for braking until its temperature exceeds the predetermined critical value at which point a secondary brake section is engaged.

4. A system as in claim 3, wherein there is further provided pressure sensor means for sensing brake line pressure when the brakes are applied, said control means having encoded therein a predetermined relationship between actual brake pressure and friction force providing a calculated friction force and having means for comparing measured friction forces to calculated friction forces and means for switching from one brake section to the other.

5. A system as in claim 4, wherein said control means is encoded with a predetermined relationship between brake pressure, friction force and time, providing a calculated rate of change of friction force with time and a measured rate of change of friction force with time and in the event said measured friction force is less than the calculated friction force, said control means compares the measured rate of change of friction force with time to the calculated rate of friction force with time, and in the event said measured rate of change of friction force with time is less than the calculated rate of change of friction force with time, then the secondary braking system is engaged.

6. A vehicle braking system as in claim 3, wherein said system further includes hydraulic means for applying braking forces to the primary and secondary sections; brake pressure selector means for selectively applying the braking forces to said sections; and said control unit being coupled to the selector for controlling the braking section to which the forces are selectively applied.

7. A system as in claim 3, wherein indicator means are provided to indicate to a vehicle operator the functioning of the system.

8. A system as in claim 3, wherein there is provided means for manually overriding the control unit whereby a vehicle operator can control the system.

9. A system as in claim 3, wherein auxiliary cooling means are provided for cooling the braking system more rapidly than under ambient conditions and said cooling means being coupled to and controlled by the control unit.

10. A system as in claim 3, wherein each wheel includes a wheel shaft which carries a plurality of braking discs and pads which are divided into a primary and a secondary braking section.

11. A system as in claim 3, wherein there is provided a pair of wheels at each vehicle support point and each has a wheel shaft with the primary braking section associated with one wheel and the secondary braking section associated with the other wheel.

12. A braking system as in claim 1 or 3, further including means for sensing the length of time the temperature of the brake section in use exceeds the predetermined critical value, said control means further including means for comparing the actual time with a predetermined time, and in the event such actual time exceeds said predetermined time, engaging a brake section as set forth.

13. A braking system as in claim 2 or 3, further including means for sensing the actual rate of change of brake pressure upon brake initiation, said control means further including means for comparing the actual rate of change with a predetermined rate of change, and in the event the actual rate of change is less than the predetermined rate of change, engaging a brake section as set forth.

* * * * *